Aug. 29, 1967    G. H. FORSYTH ETAL    3,338,109
GEAR TRAINS
Filed May 25, 1965    2 Sheets-Sheet 1

United States Patent Office 3,338,109
Patented Aug. 29, 1967

3,338,109
GEAR TRAINS
George Howard Forsyth, Grange-Over-Sands, and Andrew Campbell Grant, Barrow-in-Furness, England, assignors to Vickers Limited, Millbank, London, England, a British company
Filed May 25, 1965, Ser. No. 458,628
Claims priority, application Great Britain, May 25, 1964, 21,588/64
7 Claims. (Cl. 74—410)

ABSTRACT OF THE DISCLOSURE

Gear train, including pinions located respectively on first and second horizontal shafts, a gear wheel meshing with said pinions, a member supporting a driven shaft comprising a part of a fluid-tight chamber extending below the driven shaft and means for supplying fluid to the chamber to floatingly support the driven shaft.

---

This invention relates to gear trains.

According to the present invention, there is provided a gear train comprising first and second parallel shafts for connection to a driving shaft, first and second pinions fixed to the respective first and second shafts for rotation therewith, driven means rotatable about an axis and connected to said first and second pinions for driving thereby, smooth, annular, external surface portions of said driven means co-axial with said driven means and extending along said axis, a gearwheel forming part of said driven means and meshing with said first and second pinions, a driven shaft forming part of said driven means and fixed co-axially to said gearwheel, first and second bearings disposed at respective opposite sides of said axis, having their axes lying in a plane containing said axis, practically in bearing contact with said surface portions, and preventing movement of said driven shaft in directions in said plane perpendicular to said axis, and supporting means for supporting said gearwheel in such manner as to permit small movement of said gearwheel perpendicularly to said plane.

Figure 1:
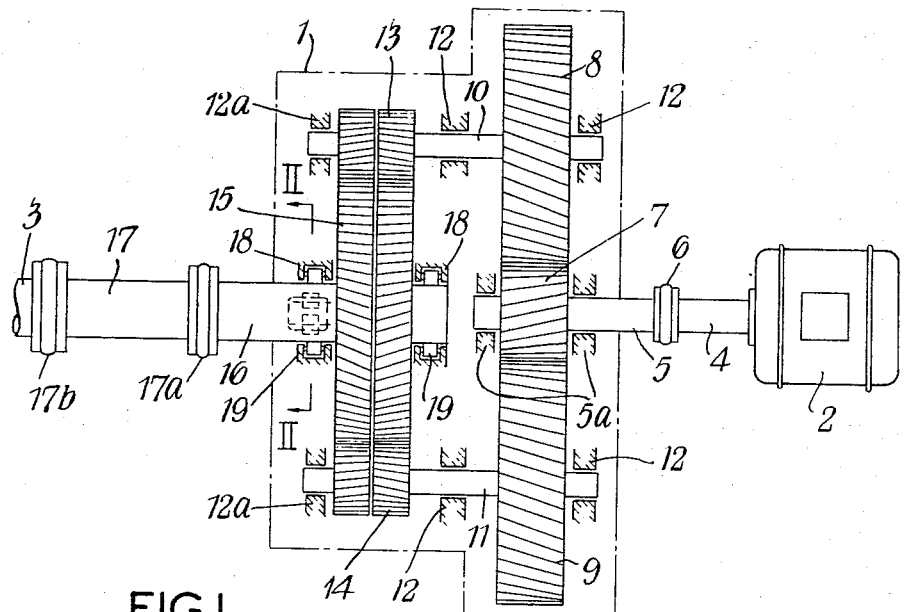
Figure 2:
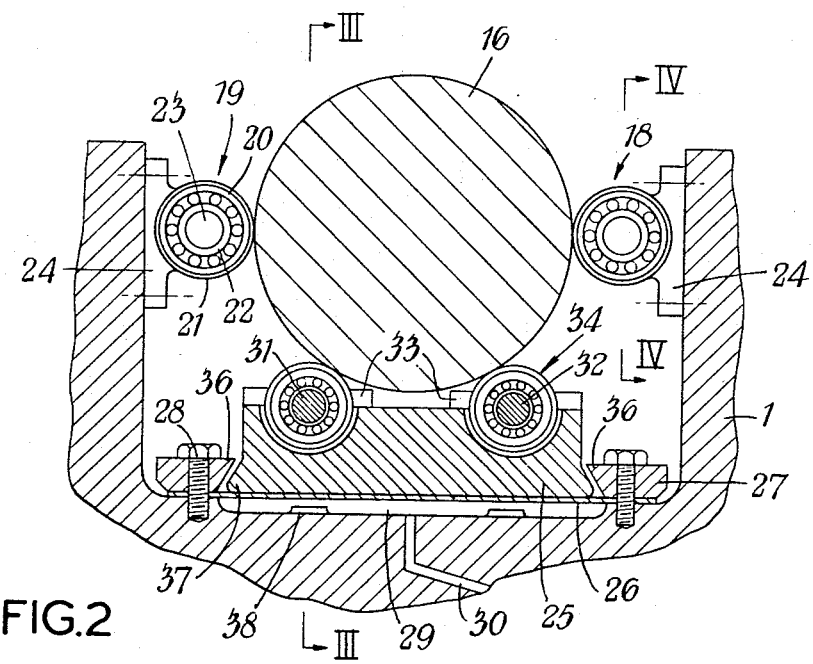
Figure 3:
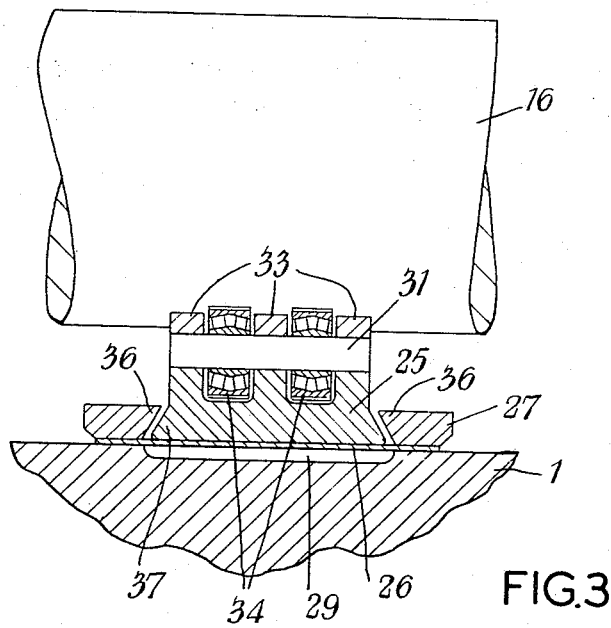
Figure 4:
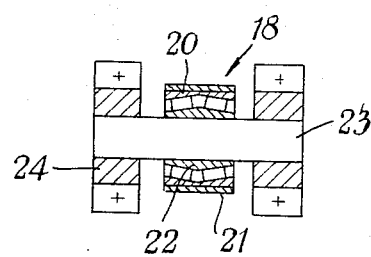
Figure 5:
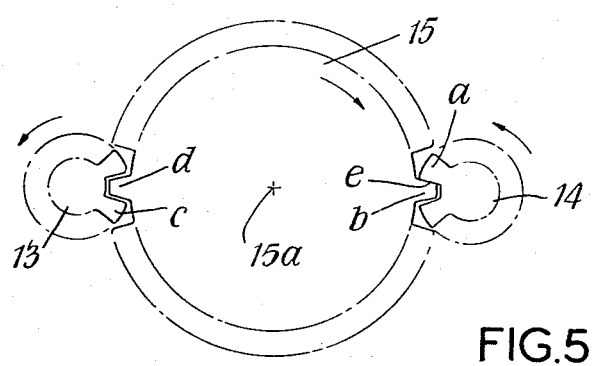

In order that the invention may be clearly understood and readily carried into effect, reference will now be made by way of example to the accompanying drawings, in which:

FIGURE 1 is a diagrammatic plan view of a gear train,
FIGURE 2 is a section taken on the line II—II of FIGURE 1,
FIGURE 3 is a section on the line III—III of FIGURE 2,
FIGURE 4 is a section on the line IV—IV of FIGURE 2, and
FIGURE 5 is a diagram illustrating the relationship between the teeth of two pinions and a gear wheel of the gear train.

Referring to the drawings, the gear train is intended for coupling a prime mover, such as an electric motor which rotates at a comparatively high speed, to a driven machine such as the rotating drum of, for example, a rotary kiln, rotary cooler or mill (as are used in the cement industry), which rotating drum turns at a comparatively slow rate. As illustrated in FIGURE 1, the gear train is mounted within a casing 1 and serves to transmit drive from an electric motor 2 to an output shaft 3 which is itself connected to the rotary drum (not shown). The output shaft 4 of the motor 2 is connected to an input shaft 5 of the gear train by way of a flexible coupling 6. Bearings 5a support the shaft 5 for rotation and take the axial thrust of the shaft. The shaft 5 carries a pinion 7 having single helical teeth, and the pinion 7 meshes with two gearwheels 8 and 9 which are disposed one on each side of the pinion 7 with the axes of the pinion 7 and the two wheels 8 and 9 lying in the same horizontal plane.

The gearwheels 8 and 9 are mounted on intermediate shafts 10 and 11 respectively, the shafts 10 and 11 being mounted in bearings diagrammatically illustrated at 12 and 12a of which the bearings 12a take the axial thrusts of the shafts 10 and 11. The axial thrust is produced by the single helical section 7 to 9, and is shared equally between the bearings 12a. The shafts 10 and 11 carry pinions 13 and 14 respectively, the pinions 13 and 14 meshing with a "floating" gearwheel 15. The pinions 13 and 14 and the gearwheel 15 have double helical teeth, the teeth being of enveloping (conforming circular arc) profile, such as V.B.B. (Vickers-Bramley-Bostock) profile. The wheel 15 is mounted on a shaft 16 and is connected to the output shaft 3 by way of a flexible coupling 17a, a shaft 17, and a flexible coupling 17b. The shaft 16 is usually horizontal. The axis of the gearwheel 15 is allowed to change its position in a vertical direction only, lateral movement of the axis of the wheel being prevented as will be described hereinafter. The axis of the wheel 15 does, however, always remain parallel to a given line, usually a horizontal line.

The shaft 16 is rotatably supported by two self-aligning roller bearings 18 which are disposed to one and the same side of the shaft 16 but to opposite sides of the gearwheel 15, and by two further self-aligning roller bearings 19 which are disposed to the other side of the shaft 16 but to opposite sides of the gearwheel 15. The outer races 20 of the bearings 18 and 19 are all practically in rolling contact with the peripheral surface of the shaft 16, and each include an outer peripheral steel lining 21. The inner race 22 of each roller-bearing 18 or 19 is secured to a pin 23 fitted at its ends in brackets 24 firmly bolted to the casing 1. The axes of the pins 23 lie in a substantially horizontal plane containing the axis of the shaft 16, and are parallel to that axis. As will be seen from FIGURE 2, the roller bearings 18 and 19 contact the shaft 16 at diametrically opposed points and thereby prevent the shaft from moving laterally horizontally. A block 25 is mounted on a rubber diaphragm 26 the edge of which is clamped to the casing 1 by a clamping ring 27 encircling the block 25 and fastened to the casing 1 by bolts 28. A recess is cut out of the casing 1 at a location underneath the diaphragm 26 so as to form a chamber 29 between the diaphragm 26 and the casing 1, a duct 30 being in communication with this chamber. On the top side of the block 25 there are two shafts 31 and 32 arranged with their axes parallel to that of the shaft 16 and these shafts 31 and 32 are each secured to the top side of the block 25 by means of three securing covers 33. On each of the shafts 31 and 32 between each two adjacent securing covers 33 a self-aligning roller bearing 34 is fitted, the outer peripheral surfaces of the outer races of the four bearings 34 being lined with respective steel tyres 35. The shafts 31 and 32 are so positioned that the four steel tyres 35 give rolling support to the shaft 16. The horizontal distance between the axis of the shaft 31 and the axis of the shaft 16 is the same as that between the axis of the shaft 32 and the axis of the shaft 16. The ring 27 has inwardly facing projections 36 which overlap outwardly facing projections 37 on the base of the block 25. These projections 36 and 37 co-operate to limit the upward movement of the block 25 relatively to the casing. Projections 38 on the casing 1 underneath the diaphragm 26 limit the downward movement of the block 25. For small vertical movements of the shaft 16, the four lateral roller bearings 18 and 19 prevent the shaft 16 from moving horizontally.

By the supply of oil under pressure via the duct 30 to the chamber 29 beneath the block 25, the four roller bearings 34 can be arranged to support floatingly the combined deadweight of the shaft 16 and the gearwheel 15 provided that the four rollers are situated below the centre of gravity of the shaft 16 and the gearwheel 15.

Referring to FIGURE 5, the gearwheel 15 is shown meshing with the pinions 13 and 14. The pinions 13 and 14 are driving the gearwheel 15 and at any instant accumulated pitch errors can cause a situation as shown in FIGURE 5 to occur. A tooth *a* of the pinion 14 is driving against a tooth *b* of the gearwheel, and a tooth *c* of the pinion 13 should be driving against a tooth *d* of the gearwheel, but in this case the teeth *c* and *d* are not in contact, so that load sharing is not taking place. To enable load sharing to occur and considering that the pinions 13 and 14 are not able to move vertically, then the gearwheel 15 must be allowed to drop and pivot on a contact point *e* between the teeth *a* and *b*, until the teeth *d* and *c* contact. This movement of the gear wheel 15 is equivalent to the axis 15*a* of the gearwheel moving in a vertical plane with slight rotation of the gearwheel about the axis 15*a*. Therefore by preventing lateral movement of the axis 15*a* in a horizontal plane and allowing vertical movement only the shafts 10 and 11 can be made each to take 50% of the load.

This is why the gearwheel 15 is hydraulically floated between the pinions 13 and 14, so that any tendency for the teeth on the gearwheel 15 to leave those on the pinions 13 and 14 is automatically compensated for by the gearwheel 16 rising or falling in a vertical plane dictated by the four bearings 18 and 19.

In cases where the deadweight of the gearwheel 15 and shaft 16 is insignificant, then the hydraulic support arrangement including the block 25 can be omitted, the deadweight of the gearwheel and shaft being taken by the two pinions 13 and 14.

Instead of having a hydraulic support arrangement at only one side of the gearwheel 15, it is possible to have two such arrangements, one at each side of the gearwheel 15, the effective areas of these support arrangements being chosen to suit the actual deadweight imposed upon them, so that for small vertical movements the gearwheel 15 and the shaft 16 remain substantially horizontal.

An additional advantage of the above-described hydraulic support arrangement is its damping effect on vibrations of the gearwheel 15 and the shaft 16.

An advantage of use of roller bearings to support the shaft 16 is that a tooth profile, such as the V.B.B. profile, needing great accuracy in the centre distance between meshing wheels can be used for the wheels 13 to 15.

What is claimed is:

1. A gear train comprising first and second substantially horizontal shafts for operative connection to a driving shaft, first and second pinions fixed to the respective first and second shafts for rotation therewith, a gearwheel meshing with said first and second pinions for driving thereby, a driven shaft fixed co-axially to said gearwheel, smooth, cylindrical, external surface portions of said driven shaft co-axial with said driven shaft, bearing inner races disposed at respective opposite sides of said driven shaft and having their axes substantially parallel to the axis of said driven shaft, bearing outer races co-axially encircling the respective inner races, having cylindrical external peripheral surfaces practically in rolling contact with said surface portions, and preventing lateral horizontal movement of said driven shaft, bearing members interposed between the inner races, on the one hand, and the outer races, on the other hand, and in rolling contact therewith, and supporting means for supporting said gearwheel in such manner as to permit small, substantially vertical movement of said gearwheel.

2. A gear train comprising first and second substantially horizontal shafts for operative connection to a driving shaft, first and second pinions fixed to the respective first and second shafts for rotation therewith, a gearwheel meshing with said first and second pinions for driving thereby, a driven shaft fixed co-axially to said gearwheel, smooth, annular, external surface portions of said driven shaft co-axial with said driven shaft and extending along said driven shaft, bearing inner races disposed at respective opposite sides of said driven shaft and having their axes lying in a substantially horizontal plane containing the axis of said driven shaft, bearing outer races co-axially encircling the respective inner races, practically in rolling contact with said surface portions and preventing lateral horizontal movement of said driven shaft, bearing members interposed between the inner races, on the one hand, and the outer races, on the other hand, and in rolling contact therewith, a supporting member disposed beneath said driven shaft, portions of said supporting member bounding a substantially fluid-tight chamber extending below said driven shaft, supply means connected to said chamber for supplying to said chamber a fluid under pressure to support floatingly said driven shaft and said gearwheel and thus to permit substantially vertical movement of said gearwheel, and limiting means operable to limit narrowly such substantially vertical movement.

3. A gear train comprising first and second substantially horizontal shafts for operative connection to a driving shaft, first and second pinions fixed to the respective first and second shafts for rotation therewith, a gearwheel meshing with said first and second pinions for driving thereby, a driven shaft fixed co-axially to said gearwheel, smooth, annular, external surface portions of said driven shaft co-axial with said driven shaft and extending along said driven shaft, bearing inner races disposed at respective opposite sides of said driven shaft and having their axes lying in a substantially horizontal plane containing the axis of said driven shaft, bearing outer races co-axially encircling the respective inner races, practically in rolling contact with said surface portions and preventing lateral horizontal movement of said driven shaft, bearing members interposed between the inner races, on the one hand, and the outer races, on the other hand, and in rolling contact therewith, a bearing block beneath said driven shaft and supporting said driven shaft, surface portions of said block defining a lower end face thereof, a fixed supporting member disposed beneath said driven shaft, portions of said supporting member bounding a substantially fluid-tight chamber between said lower end face and said supporting member, supply means connected to said chamber for supplying to said chamber a fluid under pressure to support floatingly said driven shaft and said gearwheel and thus to permit substantially vertical movement of said gearwheel, and limiting means operable to limit narrowly such substantially vertical movement.

4. A gear train comprising first and second substantially horizontal shafts for operative connection to a driving shaft, first and second pinions fixed to the respective first and second shafts for rotation therewith, a gearwheel meshing with said first and second pinions for driving thereby, a driven shaft fixed co-axially to said gearwheel, smooth, annular, external surface portions of said driven shaft co-axial with said driven shaft and extending along said driven shaft, bearing inner races disposed at respective opposite sides of said driven shaft and having their axes lying in a substantially horizontal plane containing the axis of said driven shaft, bearing outer races co-axially encircling the respective inner races, practically in rolling contact with said surface portions, and preventing lateral horizontal movement of said driven shaft, bearing members interposed between the inner races, on the one hand, and the outer races, on the other hand, and in rolling contact therewith, a bearing block disposed beneath said driven shaft, bearings mounted on said bearing block and supporting said driven shaft at respective opposite sides of a vertical plane containing said axis, surface portions of said block defining a lower end face thereof, a fixed supporting member disposed beneath said driven shaft, portions of said supporting member defining a substantially fluid-tight chamber between said lower end face and said supporting member, supply means connected to said chamber for supplying to said chamber a fluid under pressure to support floatingly said driven shaft and said gearwheel and thus to permit substantially vertical movement of said gearwheel, and limiting means operable to limit narrowly such substantially vertical movement.

5. A gear train comprising first and second substantially horizontal shafts for operative connection to a driving shaft, first and second pinions fixed to the respective first and second shafts for rotation therewith, a gearwheel meshing with said first and second pinions for driving thereby, a driven shaft fixed co-axially to said gearwheel, smooth, annular, external surface portions of said driven shaft co-axial with said driven shaft and extending along said driven shaft, bearing inner races disposed at respective opposite sides of said driven shaft and having their axes lying in a substantially horizontal plane containing the axis of said driven shaft, bearing outer races co-axially encircling the respective inner races, practically in rolling contact with said surface portions and preventing lateral horizontal movement of said driven shaft, bearing members interposed between the inner races, on the one hand, and the outer races, on the other hand, and in rolling contact therewith, a bearing block disposed beneath said driven shaft, bearings mounted on said bearing block and supporting said driven shaft at respective opposite sides of a vertical plane containing said axis, surface portions of said block defining a lower end face thereof, a fixed supporting member disposed beneath said driven shaft, a clamping ring encircling said block and connected to said supporting member, a flexible diaphragm covering from below said lower end face and clamped at its edge between said clamping ring and said supporting member, and portions of said diaphragm and of said supporting member defining a substantially fluid-tight chamber beneath said block, supply means connected to said chamber for supplying to said chamber a fluid under pressure to support floatingly said block, said driven shaft and said gearwheel and thus to permit substantially vertical movement of said gearwheel, and limit portions on said block, said clamping ring, and said supporting member operable to limit narrowly such substantially vertical movement.

6. A gear train comprising first and second substantially horizontal shafts for operative connection to a driving shaft, first and second pinions fixed to the respective first and second shafts for rotation therewith, a gearwheel meshing with said first and second pinions for driving thereby, a driven shaft fixed co-axially to said gearwheel, smooth, annular, external surface portions of said driven shaft co-axial with said driven shaft and extending along said driven shaft and located at respective opposite sides of said gearwheel, first and second bearing inner races disposed at the same side of said driven shaft but at opposite sides of said gearwheel and having their axes lying in a substantially horizontal plane containing the axis of said driven shaft, third and fourth bearing inner races disposed at the opposite side of said driven shaft to the first and second inner races but at opposite sides of said gearwheel and having their axes lying in said plane, bearing outer races co-axially encircling the respective inner races, practically in rolling contact with said surface portions and preventing lateral horizontal movement of said driven shaft, bearing members interposed between the inner races, on the one hand, and the outer races, on the other hand, and in rolling contact therewith, and supporting means for supporting said gearwheel in such manner as to permit small, substantially vertical movement of said gearwheel.

7. A gear train comprising first and second parallel shafts for operative connection to a driving shaft, first and second pinions fixed to the respective first and second shafts for rotation therewith, driven means rotatable about a substantially horizontal axis and operatively connected to said first and second pinions for driving thereby, smooth, annular, external surface portions of said driven means co-axial with said driven means and extending along said axis, a gearwheel forming part of said driven means and meshing with said first and second pinions, a driven shaft forming part of said driven means and fixed co-axially to said gearwheel, first and second bearings disposed at respective opposite sides of said axis, having their axes lying in a substantially horizontal plane containing said axis, practically in bearing contact with said surface portions, and preventing lateral horizontal movement of said driven shaft, a supporting member disposed beneath said driven shaft, portions of said supporting member bounding a substantially fluid-tight chamber extending below said driven shaft, and supply means connected to said chamber for supplying to said chamber a fluid under pressure to support floatingly said driven shaft and said gear wheel and thus to permit substantially vertical movement of said gearwheel.

References Cited
UNITED STATES PATENTS

| | | | |
|---|---|---|---|
| 551,196 | 12/1895 | Richards | 308—203 X |
| 1,393,391 | 10/1921 | Parsons et al. | 74—410 X |
| 1,696,740 | 12/1928 | Treschow | 74—410 |
| 2,323,648 | 7/1943 | Cranshaw et al. | 74—410 |
| 2,948,162 | 8/1960 | Bing | 74—399 |
| 2,995,046 | 8/1961 | Mansachs | 74—410 |
| 3,174,810 | 3/1965 | Roubal | 308—203 X |

DONLEY J. STOCKING, *Primary Examiner.*

DAVID J. WILLIAMOWSKY, L. H. GERIN,
*Examiners.*